(12) United States Patent
Khoury

(10) Patent No.: US 6,843,667 B2
(45) Date of Patent: Jan. 18, 2005

(54) CORDLESS BASE

(76) Inventor: Edward Khoury, 19 Scouler Way, Bateman, Perth, Western Australia 6150 (AU)

( * ) Notice: Subject to any disclaimer, the term of this patent is extended or adjusted under 35 U.S.C. 154(b) by 0 days.

(21) Appl. No.: 10/479,261

(22) PCT Filed: Jul. 10, 2001

(86) PCT No.: PCT/AU01/00827
§ 371 (c)(1),
(2), (4) Date: Apr. 30, 2004

(87) PCT Pub. No.: WO02/097927
PCT Pub. Date: Dec. 5, 2002

(65) Prior Publication Data
US 2004/0175989 A1 Sep. 9, 2004

(30) Foreign Application Priority Data
Jun. 1, 2001 (AU) .............................................. PR5384

(51) Int. Cl.$^7$ .............................................. H01R 13/44
(52) U.S. Cl. ...................... 439/131; 439/535; 439/640; 439/928; 439/929; 439/568; 439/534; 219/432
(58) Field of Search ................................. 439/535, 131, 439/640, 928, 650, 929, 568, 534; 219/432; 320/115, 113; 312/223.1, 223.6

(56) References Cited

U.S. PATENT DOCUMENTS

| | | | | |
|---|---|---|---|---|
| 2,722,777 A | * | 11/1955 | Simpson ...................... 40/425 |
| 2,798,930 A | * | 7/1957 | Frost ........................... 219/392 |
| 2,863,037 A | * | 12/1958 | Johnstone ................... 219/432 |
| 3,056,013 A | * | 9/1962 | Hollerith ..................... 219/432 |
| 3,608,988 A | * | 9/1971 | Amberg .................... 312/223.1 |
| 3,715,627 A | * | 2/1973 | D'Ausillio ................... 361/643 |
| 3,735,329 A | | 5/1973 | Funabashi et al. |
| 3,794,952 A | * | 2/1974 | Dowis .......................... 439/21 |
| 3,915,079 A | * | 10/1975 | Balderson ..................... 99/281 |
| 4,500,150 A | * | 2/1985 | Leibensperger et al. .... 439/502 |
| 4,577,187 A | * | 3/1986 | Barr et al. .................. 361/681 |
| 4,588,938 A | * | 5/1986 | Liautaud et al. ............ 320/115 |
| 4,619,489 A | * | 10/1986 | Hinkens ..................... 439/502 |
| 4,647,831 A | * | 3/1987 | O'Malley et al. ........... 320/110 |
| 4,672,292 A | * | 6/1987 | Hernandez .................. 320/110 |
| 4,681,385 A | * | 7/1987 | Kruger et al. .............. 439/252 |
| 4,739,242 A | * | 4/1988 | McCarty et al. ............ 320/110 |
| 4,784,616 A | * | 11/1988 | Zimmermann .............. 439/568 |
| 4,985,845 A | * | 1/1991 | Gotz et al. .................. 700/286 |
| 4,996,628 A | * | 2/1991 | Harvey et al. .............. 361/735 |
| 5,057,381 A | * | 10/1991 | Persen ............................ 429/7 |
| 5,058,045 A | * | 10/1991 | Ma ............................. 361/663 |

(List continued on next page.)

FOREIGN PATENT DOCUMENTS

| | | |
|---|---|---|
| DE | 29702211 | 5/1997 |
| GB | 2186184 | 8/1987 |
| GB | 2189354 | 10/1987 |
| GB | 2318926 | 5/1998 |
| WO | WO96/22718 | 8/1996 |

Primary Examiner—Ross Gushi
(74) Attorney, Agent, or Firm—D. Peter Hochberg; Sean Mellino; Katherine R. Vieyra

(57) ABSTRACT

A modular appliance system comprising a plurality of modular appliances (12, 14, 16), a base unit (10) for supporting at least two of the modular appliances simultaneously or a free standing unit for supporting one or more modular appliances simultaneously or a free standing appliance for supporting one or more modular appliances simultaneously. Hingedly attached extensions (1) are movable between points under and around the base, free standing unit and free standing appliance. The extensions provide electric power through cordless connectors (4) and may be pivoted, hingedly attached or on slides.

10 Claims, 4 Drawing Sheets

U.S. PATENT DOCUMENTS

| | | | |
|---|---|---|---|
| 5,075,615 A | * | 12/1991 | Dantis .................. 320/111 |
| 5,124,532 A | * | 6/1992 | Hafey et al. ............. 219/200 |
| 5,187,422 A | * | 2/1993 | Izenbaard et al. ......... 320/110 |
| 5,283,420 A | * | 2/1994 | Montalto ................ 219/432 |
| 5,334,033 A | | 8/1994 | Milan |
| 5,415,572 A | | 5/1995 | Shepherd |
| 5,685,744 A | | 11/1997 | Blanchot et al. |
| 5,954,525 A | * | 9/1999 | Siegal et al. ............ 439/131 |
| 5,966,821 A | * | 10/1999 | Armbruster et al. ........ 30/537 |
| 5,989,070 A | | 11/1999 | Al-Turki |
| 6,049,192 A | * | 4/2000 | Kfoury et al. ............ 320/113 |
| 6,127,802 A | * | 10/2000 | Lloyd et al. ............. 320/113 |
| 6,340,807 B2 | | 1/2002 | Wang |
| 6,349,036 B1 | * | 2/2002 | Chang et al. ............. 361/730 |
| 6,568,946 B1 | * | 5/2003 | Chou ..................... 439/131 |
| 6,634,910 B2 | * | 10/2003 | Lieb et al. .............. 439/715 |
| 6,642,450 B1 | * | 11/2003 | Hsiao .................... 174/53 |
| 6,748,707 B1 | * | 6/2004 | Buchalter et al. ......... 52/220.1 |
| 6,761,578 B1 | * | 7/2004 | Stavely et al. ........... 439/489 |
| 2002/0182942 A1 | | 12/2002 | Lieb et al. |

* cited by examiner

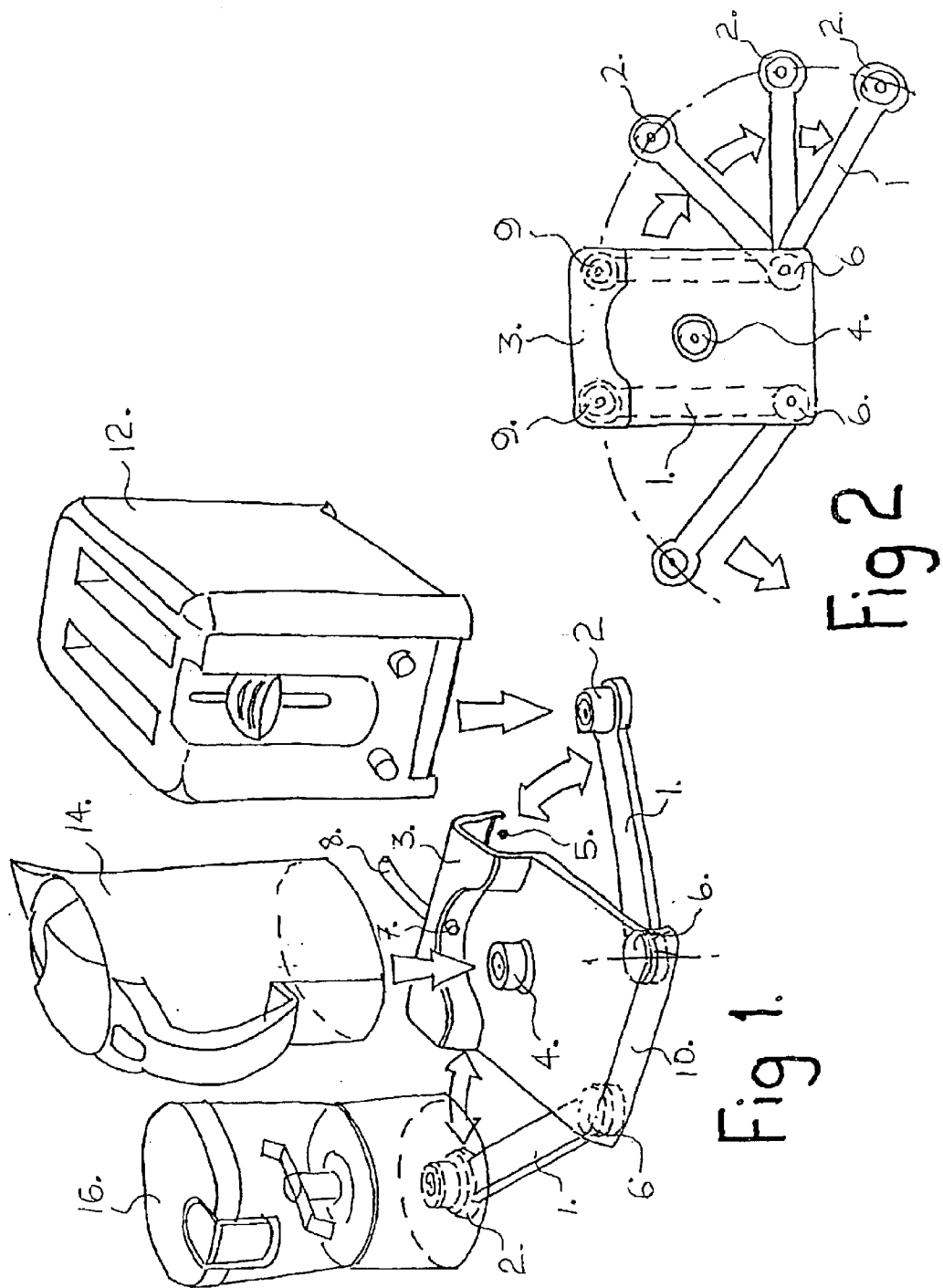

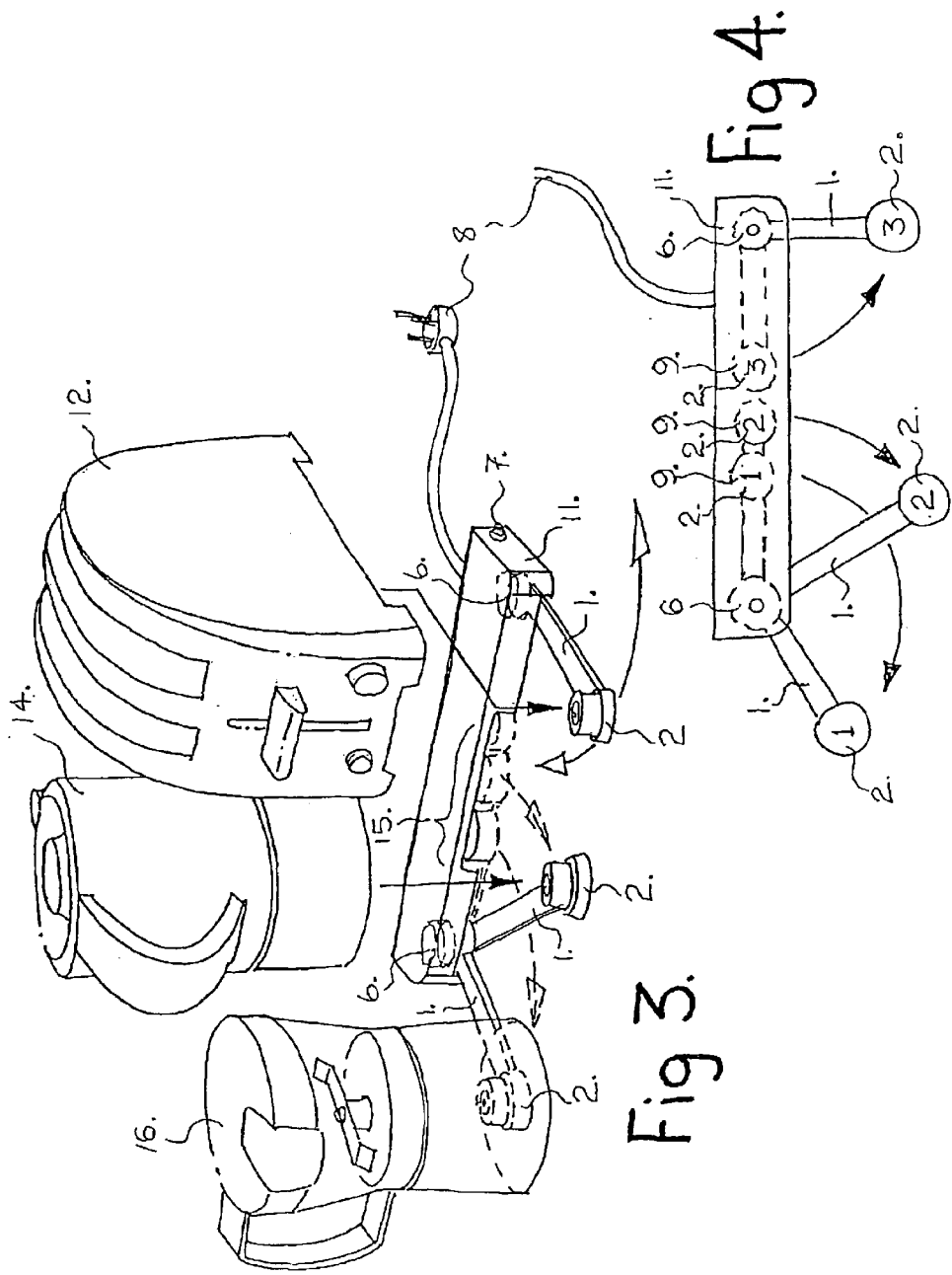

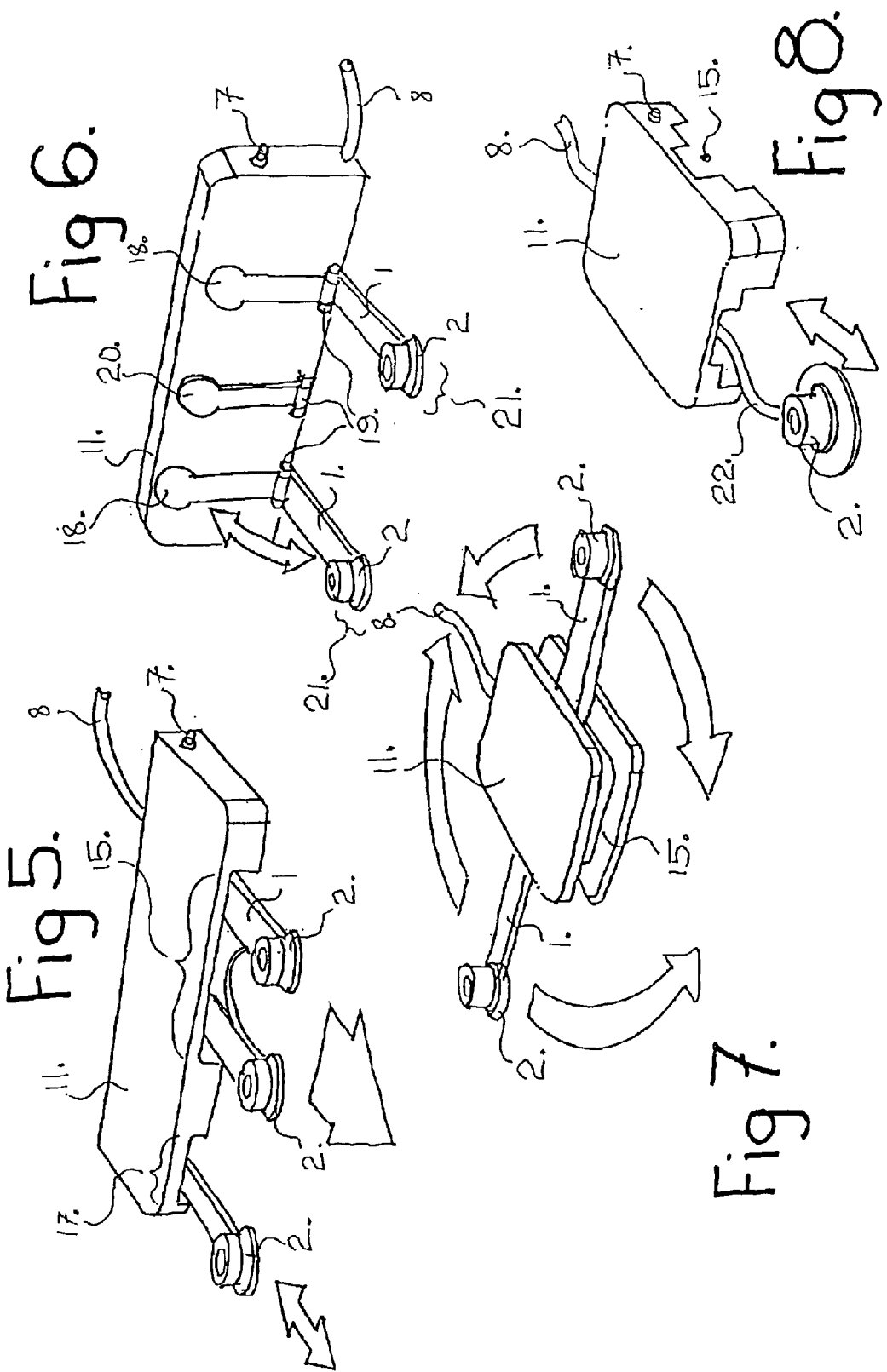

ly attached, on slides individually or jointly, or as separate connectors removable from the base and attached by electrical cable.

CORDLESS BASE

CROSS REFERENCE TO RELATED APPLICATION

This application is a national phase application of International Application No. PCT/AU01/00827, filed Jul. 10, 2001, and claims the priority of Australian application number PR5384 filed Jun. 1, 2001.

SUMMARY OF THE INVENTION

According to the first aspect of the invention there is provided a modular appliance system comprising:
  a plurality of modular appliances; and
  a base unit for supporting at least two of the modular appliances simultaneously, the base unit having at least two electrical connectors adapted for engagement with complemental connectors on respective appliances, thereby to connect the appliances to an electrical source via the base unit.

The system preferably may comprise a base with an electrical connector similar to that used in the designs of cordless kettles, which may be free standing or fixed to a work surface, the base may comprise one or more electrical connectors with one or more hingely attached extensions having electrical connectors adapted for engagement with complemental connectors on respective appliances, thereby to connect the appliances to an electrical source via the base and extensions.

The hingely attached extensions are movable between points under and inside the base in a circular fashion to any point around the hinge.

The extensions having electrical connectors may be pivoted, hingley ached, on slides individually or jointly, or as separate connectors removable from the base and attached by electrical cable.

When hingely attached to the base the electrical connectors (on extensions) may be movable in a horizontal or vertical direction through an arc with its centre being the hinge.

When pivotally attached to the base, the electrical connectors (on extensions) are pivotally moveable around the base in an arc with its centre being the pivot When attached to the base by means of slides, the electrical connectors (on extensions) may be slid to and from the base and from left to right of the base and they may be slid individually or jointly.

When removable from the base, the cordly attached electrical connectors may be removed from the base and placed anywhere around the base. The removable connectors may clip, retract or plug into the base.

According to the second aspect of the invention there is provided a free standing unit comprising:
  a plurality of modular appliances; and
  a free standing unit for supporting one or more modular appliances simultaneously, the base unit having one or more electrical connectors adapted for engagement with complemental connectors on respective appliances, thereby to connect the appliances to an electrical source via the free standing unit.

The system preferably may comprise a main body which may be free standing or fixed to a work surface or wall, the main body may comprise one, two or more hingely attached extensions having electrical connectors adapted for engagement with complemental connectors on respective appliances, thereby to connect the appliances to an electrical source via the free standing or fixed unit.

The hingely attached extensions are movable between points under and inside the free standing unit in a circular fashion to any point around the hinge.

The extensions having electrical connectors may be pivoted, hingley attached, on slides individually or jointly, or as separate connectors removable from the main body and attached by electrical cable.

When hingely attached to the main body the electrical connectors (on extensions) may be movable in a horizontal or vertical direction through an arc with its centre being the hinge.

When pivotally attached to the main body, the electrical connectors (on extensions) are pivotally moveable around the main body in an arc with its centre being the pivot.

When attached to the main body by means of slides, the electrical connectors (on extensions) may be slid to and from the main body and from left to right of the main body and they may be slid individually or jointly.

When removable from the main body, the cordly attached electrical connectors may be removed from the main body and placed anywhere around the main body. The removable connectors may clip, retract or plug into the main body.

According to the third aspect of the invention there is provided a free standing unit comprising:
  a plurality of modular appliances; and
  a free standing appliance such as a coffee maker or the like which may support one or more modular appliances simultaneously via moveable electrical connectors within the free standing appliance, the movable electrical connectors adapted for engagement with complemental connectors on respective appliances, thereby to connect the appliances to an electrical source via the free standing appliance.

The system preferably may comprise a free standing appliance such as a coffee maker or the like, which may comprise one, two or more hingely attached extensions having electrical connectors adapted for engagement with complemental connectors on respective appliances, thereby to connect the appliances to an electrical source via the free standing appliance.

The hingely attached extensions are movable between points under and inside the free standing appliance in a circular fashion to any point around the hinge.

The extensions having electrical connectors may be pivoted, hingley attached, on slides individually or jointly, or as separate connectors removable from the free stading appliance and attached by electrical cable.

When hingely attached to the free standing appliance the electrical connectors (on extensions) may be movable in a horizontal or vertical direction through an arc with its centre being the hinge.

When pivotally attached to the free standing appliance, the electrical connectors (on extensions) are pivotally moveable around the free standing appliance in an arc with its centre being the pivot.

When attached to the free standing appliance by means of slides, the electrical connectors (on extensions) may be slid to and from the free standing appliance and from left to right of the free standing appliance and they may be sild individually or jointly.

When removable from the free standing appliance, the cordly attached electrical connectors may be removed from the free standing appliance and placed anywhere around the free standing appliance. The removable connectors may clip, retract or plug into the free standing appliance.

BRIEF DESCRIPTION OF THE DRAWINGS

FIG. 1 is a perspective view of the invention (first aspect);
FIG. 2 is a top view of the invention (first aspect);

FIG. 3 is a perspective view of the invention (second aspect);

FIG. 4 is a top view of the invention (second aspect);

FIG. 5 is a perspective view of the invention (second aspect indicating the slide concept);

FIG. 6 is a perspective view of the invention (second aspect, indicating the vertical hinge concept);

FIG. 7 is a perspective view of the invention (second aspect, indicating the pivot concept);

FIG. 8 is a perspective view of the invention (second aspect, indicating the removable concept);

DESCRIPTION OF EMBODIMENTS

Figure 9:
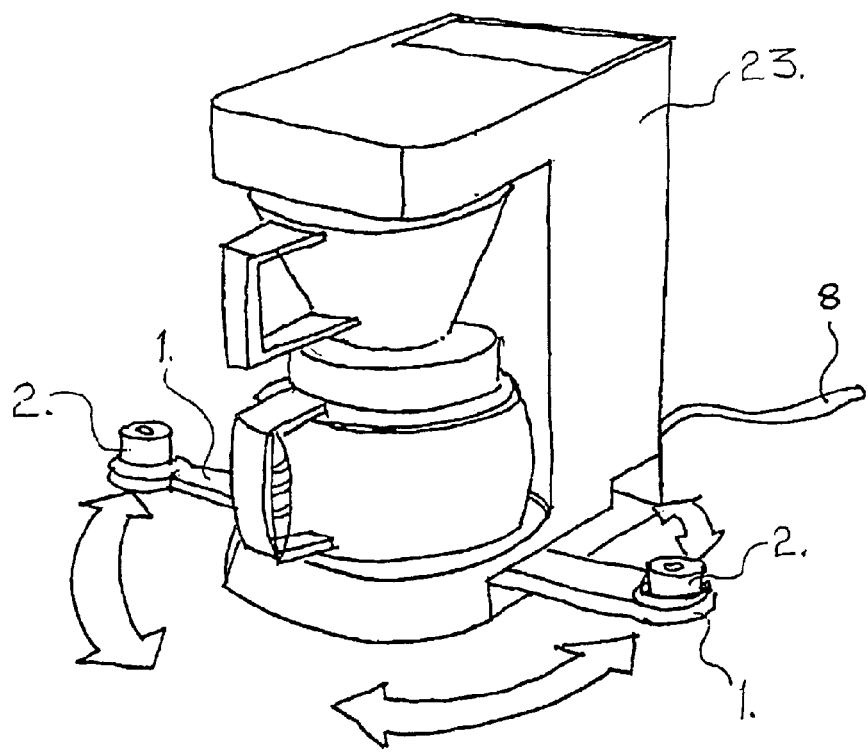
FIG. 9 is a perspective view of the invention (third aspect).

The modular appliance system illustrated in FIG. 1 comprises a generally planar base unit 10 which is moulded from a suitably tough and heat resistant plastics material such as polypropylene, and a set of modular appliances 12, 14 and 16 which can be mounted on the base unit individually or together, on the base 10 and extensions 1 and electrical connectors 2. The base 10 can be formed from other suitable plastics or materials including metals such as stainless steel or natural materials such as marble or wood.

In FIG. 1, the appliance 14 is a cordless kettle, the appliance 12 is a toaster and the appliance 16 is a chopper. It will be appreciated that the illustrated appliances are merely exemplary, and that the set of appliances usable on the base 10 may include various other appliances, or more than one identical appliance.

The base 10 may be rectangular and is provided with a locating formation in the form of an upstanding housing 1 locating step 3. The base 10 has a central upstanding cordless connector 4 of a kind known as such which mates with a complemental connector on the underside of the appliances 12, 14 and 16. The base 10 comprises extensions 1 and upstanding cordless connectors 2 which are hingley attached via hinge 6 to the base 10 so that the upstanding cordless connectors 2 may move out of the upstanding housing 1 locating step 3 on the extensions 1 in an arc from the underside 5 of the base 10 into a position away from the base 10 so that appliances 12, 14 and 16 may be located with its complemental connector to the upstanding connectors 2. On base 10, on the upstanding housing 1 locating step 3 there is provided a safety cut out 7 and an electric cable 8 which provides electric current to the base 10, extensions 1 and ultimately the cordless connectors 4 and 2.

FIG. 2 is a top view of the invention (first aspect) indicating the extensions 1, cordless connectors 2 being rotated in an arc to positions outside of the base 10 by means of the hinge 6. FIG. 2 also indicates the extensions 1 and cordless connectors 2 in the closed position 9 usually when the appliances 12, 14 and 16 (FIG. 1) are not being used.

The modular appliance system illustrated in FIG. 3 comprises a generally planar free standing unit 11 which is moulded from a suitably tough and heat resistant plastics material such as polypropylene, and a set of modular appliances 12, 14 and 16 which can be mounted onto the upstanding cordless controls 2 which are hingely attached via extensions 1 and hinges 6 to the free standing unit 11, either independently or simultaneously. The free standing unit 11 can be formed from other suitable plastics or other materials including metals such as stainless steel or natural materials such as marble or wood.

In FIG. 3, the appliance 14 is a cordless kettle, the appliance 12 is a toaster and the appliance 16 is a chopper.

It will be appreciated that the illustrated appliances are merely exemplary, and that the set of appliances usable on the free standing unit 11 may include various other appliances, or more than one identical appliance.

The free standing unit 11 may be rectangular and is provided with a cavity and opening 15 which houses the extensions 1, upstanding cordless connectors 2 and hinges 6. The free standing unit 11 may comprise of one, two or more hingley attached extensions 1 and upstanding cordless connectors 2. The upstanding cordless connectors 2 are of a kind known as such which mates with a complemental connector on the underside of the appliances 12, 14 and 16. The free standing unit 11 comprises extensions 1 and upstanding cordless connectors 2 which are hingley attached via hinge 6 to the free standing unit 11 so that the upstanding cordless connectors 2 may move out of the cavity and opening 15 on the extensions 1 in an arc from the underside of the free standing unit 11 into a position away from the free standing unit 11 so that appliances 12, 14 and 16 may be located with its complemental connector to the upstanding connectors 2. On the free standing unit 11, there is provided a safety cut out 7 and an electric cable 8 which provides electric current to the free standing unit 11, extensions 1 and ultimately the cordless connectors 2.

FIG. 4 is a top view of the invention (second aspect) indicating the extensions 1, cordless connectors 2 being rotated in an arc to positions outside of the free standing unit 11 by means of the hinge 6. FIG. 4 also indicates the extensions 1 and upstanding cordless connectors 2 in the closed position 9 usually when the appliances 12, 14 and 16 (FIG. 3) are not being used.

FIG. 5 is perspective view of the invention (second aspect) indicating the extensions 1 and upstanding cordless connectors 2 being slid out of the cavity and opening 15 and 17 making the upstanding cordless connectors 2 accessible.

FIG. 6 is a perspective view of the invention (second aspect) indicating the extensions 1 and upstanding cordless connectors 2 being hinged by means of hinges 19 from a closed position 20 in a vertical direction to an open position 21 in a horizontal direction making the upstanding cordless connectors 2 accessible.

FIG. 7 is perspective view of the invention (second aspect) indicating the extensions 1 and upstanding cordless connectors 2 being rotated out of the cavity and opening 15 making the upstanding cordless connectors 2 accessible.

FIG. 8 is perspective view of the invention (second aspect) indicating the cable 22 and upstanding cordless connectors 2 being removed from the cavity and opening 15 making the upstanding cordless connectors 2 accessible.

FIG. 9 is a perspective view of the invention (third aspect) indicating the extensions 1, cordless connectors 2 being rotated in an arc to positions outside of the free standing appliance 23.

It will be appreciated that the exact shape and configuration of the inventions described above, the connectors used and other elements and configurations and locations of connectors on the base, free standing unit and free standing appliance is purely exemplary and that numerous variations are possible without departing from the spirit and scope of the invention.

What is claimed is:

1. A modular appliance system comprising:
   a plurality of modular appliances; and
   a base unit for supporting one or more modular appliances simultaneously, the base unit being arranged to be connected to an electrical source and having at least two upstanding electrical connectors adapted for engagement with complemental connectors on said respective appliances, thereby to connect the appliances to the electrical source, at least one of the electrical connectors being movable between a closed position within the base unit and an open position adjacent to and spaced apart from the base unit, in which said open position at least one of the electrical connectors can engage a complemental connector on an appliance.

2. A modular appliance system according to claim 1 wherein the base unit defines a cavity within which at least one of the electrical connectors is received in the closed position, the cavity having an opening to permit at least one of the electrical connectors to be moved out of the cavity into the opened position thereof.

3. A modular appliance system according to claim 2 wherein at least one of the electrical connectors is mounted on an extension arm which hingedly attached to the base unit.

4. A modular appliance system according to claim 2 wherein at least one of the electrical connectors is mounted on an extension arm which is slideably attached to the base unit.

5. A modular appliance system according to claim 2 wherein the base unit includes a fixed upstanding electrical connector mounted thereon and a locating formation for correctly locating an appliance on the base unit, with said fixed upstanding electrical connector in engagement with a complemental electrical connector on the appliance.

6. A modular appliance system according to claim 2 wherein at least one of the electrical connectors is connected by an electrical cable to the base unit.

7. A modular appliance system comprising:
   a plurality of modular appliances; and
   a free-standing appliance arranged to be connected to an electrical source, the free-standing appliance having a housing defining a cavity within which at least one upstanding electrical connector is receivable, the cavity having an opening to permit said at least one upstanding electrical connector to be moved from a closed position within the cavity to an open position adjacent to and spaced apart from the free-standing appliance, in which open position at least one upstanding electrical connector can engage a complemental connector on a modular appliance, to connect the modular appliance to the electrical source.

8. A modular appliance system according to claim 7 wherein said at least one upstanding electrical connector is mounted on an extension arm which is hingedly attached to the free-standing appliance.

9. A modular appliance system according to claim 7 wherein said at least one upstanding electrical connector is mounted on an extension arm which is slideably attached to the free-standing appliance.

10. A modular appliance system according to claim 7 wherein said at least one upstanding electrical connector is connected by an electrical cable to the free-standing appliance.

* * * * *